Patented Nov. 30, 1943

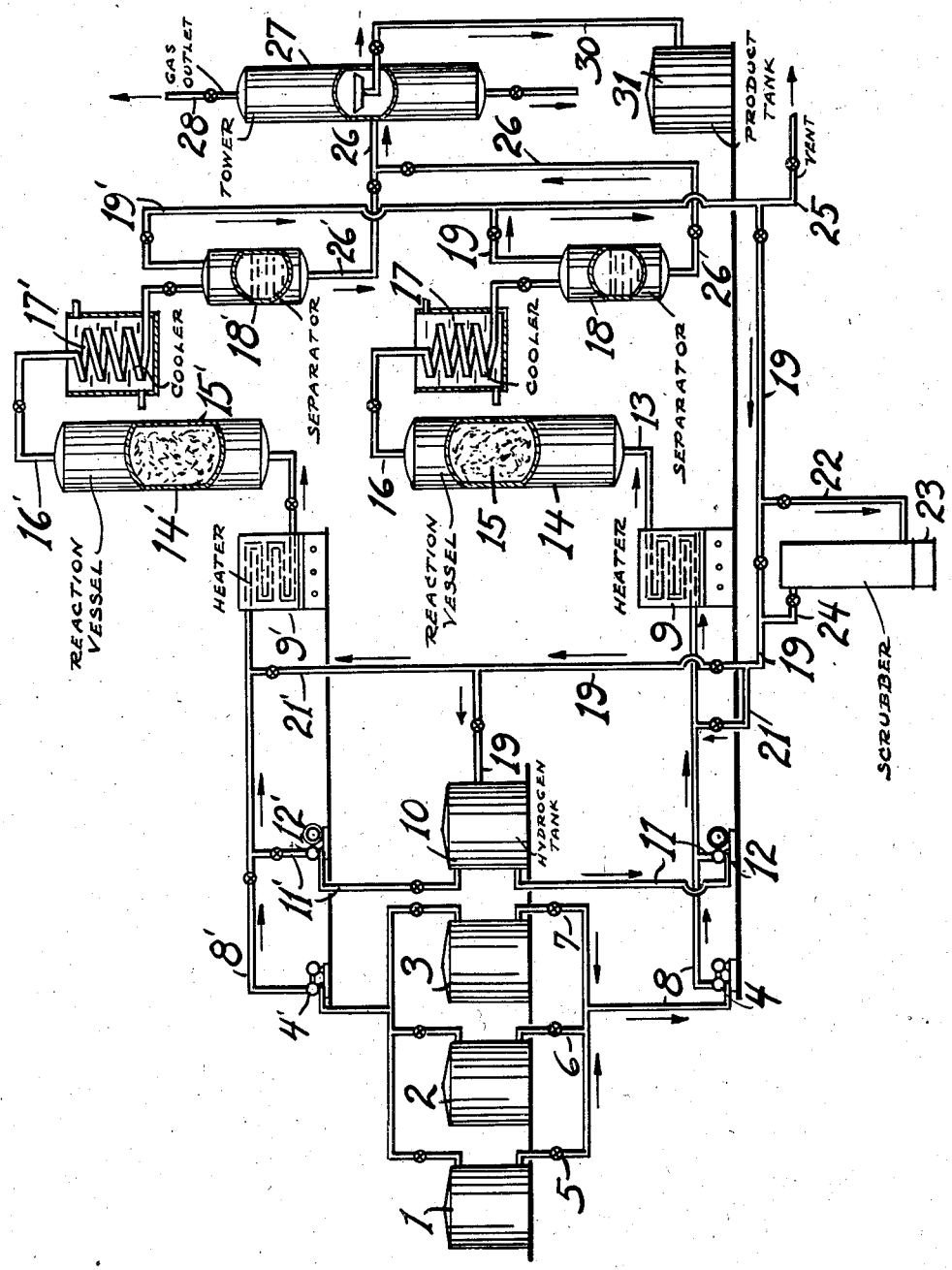

2,335,717

UNITED STATES PATENT OFFICE 2,335,717

CATALYTIC REFORMING

Albert B. Welty, Jr., Elizabeth, and Stephen F. Perry, Roselle, N. J., assignors, by mesne assignments, to Standard Catalytic Company, a corporation of Delaware Application March 28, 1940, Serial No. 326,418

3 Claims. (Cl. 196—50)

This invention relates to catalytic reforming in the presence of hydrogen and is more particularly concerned with certain improvements in the method of conducting the process by means of which the net quantity of free hydrogen produced therein may be regulated.

In our co-pending application, U. S. Serial Number 271,672, filed May 4, 1939, now U. S. Patent 2,288,336 we have described a method of controlling the net quantity of hydrogen produced in a process of catalytic reforming in the presence of hydrogen which consists in increasing or decreasing the proportion of lower boiling hydrocarbons in the feed stock to effect an increase or a decrease respectively in the net quantity of hydrogen produced. The present application is concerned with another method of controlling the net quantity of hydrogen produced in such processes which consists in increasing or decreasing the proportion of saturated hydrocarbons in the feed stock to effect an increase or a decrease respectively in the net quantity of hydrogen produced.

The term "catalytic reforming" wherever used in the specification and claims shall be understood to mean any process of subjecting materials consisting essentially of hydrocarbons substantially boiling in the gasoline range to heat treatment at a temperature in excess of 500° F. and in the presence of catalysts to produce a dehydrogenated or otherwise chemically reconstructed product, for example, of anti-knock characteristics superior to those of the starting material, with or without an accompanying change of volatility and with or without an accompanying change in molecular weight. By the term "chemically reconstructed" is meant something more than the mere removal of impurities or ordinary finishing treatments. The term catalytic reforming shall be understood to include reactions such as dehydrogenation, aromatization or cyclization, desulfurization, alkylation and isomerization, all or some of which may occur to a greater or lesser extent during the process.

The term "catalytic reforming in the presence of hydrogen" wherever used in the specification and claims shall be understood to mean a process of catalytic reforming which is carried out under such conditions that there is either no overall net consumption of free hydrogen or there is an overall net production of free hydrogen therein.

Processes of catalytic reforming are characterized in general by the fact that they must be carried out in cycles of alternate reaction and regeneration. This is for the reason that the catalyst gradually loses activity because of the formation or deposition thereon during the reaction portion of a cycle of carbonaceous contaminants and sulfur. These contaminants are ordinarily of the type which can be removed by burning and hence the regeneration portion of the cycle consists in passing inert gases containing regulated quantities of oxygen or air through the catalyst mass at a temperature which will initiate combustion of the contaminants and continuing the flow of such gases until substantially all combustible matter has been burned off of the catalyst.

One of the principal advantages of conducting the catalytic reforming process in the presence of hydrogen is that the rate at which carbonaceous contaminants are deposited on the catalyst is greatly retarded and hence the activity of the catalyst is maintained for longer periods before regeneration is necessary. The length of the reaction portion of the cycles may therefore be appreciably longer in catalytic reforming in the presence of hydrogen than in catalytic reforming in the absence of hydrogen.

The reaction portion of a cycle in catalytic reforming in the presence of hydrogen may, in the absence of other factors which may make it expedient to stop and regenerate the catalyst, be continued so long as there is no overall net consumption of free hydrogen and preferably so long as there is an overall net production of free hydrogen. Wherever the terms "over-all net consumption of free hydrogen" and "overall net production of free hydrogen" are used, they shall be understood to mean that at the end of the reaction portion of a cycle there is at least as much free hydrogen in the system as at the start of the reaction portion of said cycle, or more free hydrogen in the system than at the start of the reaction portion of said cycle. Thus it is possible that at any given instant there may be a net consumption of free hydrogen due to some disturbance in the operating conditions, but so long as there has been no net consumption of free hydrogen over the whole reaction portion of the cycle, the process comes within the above stated definition of catalytic reforming in the presence of hydrogen.

We have now found that the source from which the feed stock is obtained has an important bearing upon the net quantity of free hydrogen which is produced in catalytic reforming in the presence of hydrogen. For example, we have found that under certain operating conditions there will be a net production of free hydrogen of about 600 cubic feet per barrel of oil from an East Texas heavy virgin naphtha, whereas under the same conditions only 400 cubic feet of hydrogen per barrel of oil will be produced from a West Texas heavy virgin naphtha. We have also found that under the same conditions of temperature, pressure, and feed rate and in the presence of the same catalyst, there is a substantially greater net production of free hydrogen from a feed stock rich in paraffinic or naphthenic hydrocarbons, such as a virgin stock than there is from a feed stock rich in olefinic, aromatic or unsaturated hydrocarbons, such as a cracked stock. To illustrate this, two naphthas A and B are subjected to catalytic reforming in the presence of hydrogen. Naphtha A is a high sulfur debutanizer bottoms obtained from a cracked stock and naphtha B is a debutanized light East Texas virgin naphtha. These stocks are subjected to treatment under the following conditions:

| Catalyst | Naphtha A | Naphtha B |
|---|---|---|
| | Alumina impregnated with molybdenum oxide | |
| Temperature, °F | 964 | 945 |
| Pressure, #/sq. in | 100 | 100 |
| Feed rate, v./v./hr | 0.51 | 0.49 |
| Recycle gas rate, cu. ft./bbl | 2,470 | 2,695 |
| Hydrogen produced, cu. ft./bbl | 180 | 780 |
| Hours of run | 0-6 | 0-6 |

It will be noted that for the first six hours of the reaction portion of the cycle, 780 cubic feet of hydrogen are produced per barrel of oil from naphtha B, whereas only 180 cubic feet are produced from naphtha A. The temperature in the treatment of naphtha B is somewhat lower than that used in the treatment of naphtha A because the lower temperature is preferable for the treatment of naphtha B. However, as temperature is increased, the production of free hydrogen may also increase, particularly in the earlier hours of the reaction portion of a cycle, so that if the temperature in the treatment of naphtha B had been as high as that used in the treatment of naphtha A an even greater quantity of hydrogen may have been produced from the treatment of naphtha B.

It is known that lower pressure and higher temperature both favor the net production of free hydrogen. On the other hand, low pressure also favors the formation of coke and high temperature causes excessive volatility and loss of yield of the valuable high octane number product. It is therefore desirable to operate the process of catalytic reforming in the presence of hydrogen at as high a pressure and at as low a temperature as may be consistent with the requirements of the process and the production of the maximum yield of high quality product.

The present invention is directed to a method by which the net quantity of free hydrogen produced in catalytic reforming in the presence of hydrogen may be regulated so that it may be maintained either at a substantially uniform level throughout the reaction portion of a cycle or may be adjusted upwardly or downwardly throughout said portion of the cycle without disturbing the other operating conditions, particularly temperature and pressure.

In accordance with the invention, the composition of the feed stock is initially selected and thereafter adjusted so that there will be the proper ratio of virgin to cracked material or saturated to unsaturated hydrocarbons to cause the desired net production of free hydrogen at all times throughout the reaction portion of a cycle.

The net production of free hydrogen tends to decrease as the reaction portion of the cycle proceeds and as the catalyst loses its activity in promoting the reforming reactions. Hence, according to one modification of the invention, a feed stock relatively rich in cracked or unsaturated hydrocarbons may be used in the early hours of the reaction portion of the cycle and then as the net production of free hydrogen decreases the proportion of unsaturated hydrocarbons in the feed stock may be progressively decreased by the addition of saturated hydrocarbons. In this way, the net production of free hydrogen may be maintained.

According to another modification of the present invention, two different feed stocks, one rich in cracked material and the other rich in virgin material, may be subjected to treatment in two separate reaction vessels under conditions best adapted for the respective fractions, with a common recycle gas recovery system for the two reactors. In this way, there will be a substantial net production of free hydrogen from the reactor in which the virgin stock is being treated and a relatively small net production of free hydrogen or even a net consumption of free hydrogen in the reactor in which the cracked stock is being treated. However, because of the fact that there is a common recycle gas recovery system, an overall net production of free hydrogen may be maintained even in the event that there is a net consumption of free hydrogen in the reactor in which the cracked stock is treated.

According to still another modification of the invention in which the initial feed stock contains a substantial proportion of unsaturated hydrocarbons, the reaction portion of a cycle may be continued for a period of 6 to 15 hours or more or until the net production of free hydrogen is very small and then instead of discontinuing the reaction, a feed stock rich in saturated hydrocarbons may be substituted for the initial feed stock with the result that the reaction portion of the cycle may be continued for several hours more before the lack of a net production of free hydrogen necessitates stopping the flow of oil and regenerating the catalyst.

The method of carrying out the improved process will be fully understood from the following description when read with reference to the accompanying drawing which is a semi-diagrammatic view in sectional elevation of one type of apparatus which may be used.

Referring to the drawing, numerals 1, 2 and 3 designate supply tanks of feed stocks derived from different sources and having different contents of saturated and unsaturated hydrocarbons. Pump 4 draws feedstock from these tanks through lines 5, 6 and 7 respectively and forces it through line 8 into and through a heating means 9. Hydrogen or a gas rich in free hydrogen is supplied to line 8 through line 11 by means of pump 12.

The mixture of feed stock and gas rich in hydrogen is heated in heating means 9 to a temperature which will be suitable to maintain the required temperature in the reaction zone. The feed stock and gas rich in hydrogen may be heated together in the same heating means, in the manner illustrated in the drawing, or they may be heated separately in different heating means and thereafter combined. From heating means 9 the mixture of feed stock and hydrogen flows through line 13 into a reaction vessel 14 which contains a suitable catalyst 15 the nature of which will be more fully disclosed below. The reacting materials may flow through the reaction vessel in either an upward or downward direction.

Reaction vessel 14 is maintained at a temperature between 800 and 1050° F., preferably between 850 and 1000° F. and under a pressure between slightly above atmospheric and about 750 pounds per square inch. Suitable pressures in most cases are between 50 and 600 pounds per square inch although higher pressures can, of course, be used. The rate at which the feed stock is passed through the reaction vessel may be between 0.3 and 5.0 volumes of liquid oil per volume of catalyst per hour and the quantity of gas rich in free hydrogen which accompanies the oil through the reaction vessel may be between 1000 and 10,000 cubic feet per barrel of oil.

The products of reaction leave reaction vessel 14 through line 16, pass through a cooling means 17 and then discharge into a separating means 18 wherein liquid and gaseous products may be separated. The gaseous products which are rich in free hydrogen are removed from separating means 18 through line 19 by means of pump 20 and returned to hydrogen supply tank 10 or recycled directly to the system through line 21. In the event it is necessary or desirable to scrub the recycle gases to remove a portion of the hydrocarbon constituents therefrom they may be passed through line 22 and scrubbing means 23 and then returned to line 19 through line 24. If too much gas is being produced or if it is desired for any other reason to remove a portion of it from the system it may be vented through line 25.

Returning to the separating means 18, the liquid products are removed therefrom through line 26 and introduced into a fractionating means 27 from which fractions too low boiling for the desired product are removed through line 28, fractions too high boiling for the desired product are removed through line 29, and fractions boiling in the range of the desired product are removed through line 30 and collected in tank 31.

In the event it is desired to operate two separate reaction vessels with a common recycle gas recovery system the drawing illustrates how this may be done. In the drawing, similar pieces of apparatus are designated by the same number but the second unit is designated by numbers marked prime ('). For example, the reaction vessel of the second unit is 14', the heating means is 9', the separating means is 18' and so on. Certain pieces of equipment such as the feed supply tanks 1, 2 and 3, and the fractionating means 27 need not be duplicated, one item serving both units. In some cases it may be desirable to use separate fractionating means for each reaction zone in order to keep the liquid products of each zone separate, and in such cases a comman recycle gas system may of course be used.

It will be understood also that more than two units may be operated with a common recycle gas recovery system, the essential purpose being to combine units operating on different feed stocks so that there will be an overall net production of free hydrogen even though one or more units may show a net consumption of free hydrogen.

The flow of oil and hydrogen through the reaction vessels is continued until (1) there ceases to be an overall net production of free hydrogen or (2) the octane number and characteristics of the product being produced are not up to the level which the particular catalyst used is known to be capable of maintaining, whichever of these things occurs first. In most cases the second of these things will occur first, after from 0.25 to 50 hours or more, depending upon the feed rate and temperature. The shorter period lengths will be used at the higher feed rates and temperatures. The flow of oil and hydrogen is then stopped and the catalyst is subjected to any suitable regeneration treatment. One convenient method is to pass hot inert gases containing regulated quantities of oxygen through the catalyst mass until substantially all combustible material has been burned off. Following the regeneration treatment, the flow of oil and hydrogen may be resumed.

The catalysts used in the process may be selected from a wide variety of different materials which promote reforming. Among these may be mentioned oxides or sulfides of metals of the II, IV, V, VI and VIII groups of the periodic system, especially molybdenum, tungsten, chromium, vanadium, cobalt and nickel. These materials are preferably used in combination with supporting materials such as natural or activated clays, synthetic clays, bauxite, alumina, "activated alumina," alumina gel, peptized alumina, silica, silica gel, aluminum silicates of various types, silica-magnesia, and many others. The catalyst compositions can be prepared in different ways as by mechanical mixing, impregnation and co-precipitation. They are preferably used in the form of small lumps, cubes, pills, tablets, pellets, granules or other pieces of regular or irregular shape and of relatively small dimension.

The feed stocks to which the present process may be applied should consist of hydrocarbons substantially boiling in the gasoline range, say from about 90 to 450° F. or somewhat higher. Subject to the predominantly saturated or unsaturated character of the feed stock that may be required in each particular case, the feed stocks may be derived from any source. For example, they may be obtained by the distillation, destructive distillation, cracking, catalytic cracking, hydrogenation or destructive hydrogenation of coals, tars, mineral oils, shales, peats, lignites, brown coals, bitumens and other solid or semi-solid carbonaceous materials, or by synthetic processes such as the Fischer synthesis, or by polymerization, gas reversion, solvent extraction and other processes, e. g. a hydrocarbon oil may be separated into two fractions, rich in saturated and unsaturated constituents, respectively.

The product of the process may of course be mixed with small amounts of anti-knock agents such as tetraethyl lead and iron carbonyl, or may be blended with agents such as iso-pentane, alkylated isobutane or other iso-paraffins, isopropyl ether and hydrogenated polymers of isobutylene. Suitable oxidation and gum inhibiting agents may also be added.

This invention is not limited by any theories of the mechanism of the reactions nor by any details which have been given merely for purposes of illustration, but is limited only in and by the following claims in which it is intended to claim all novelty inherent in the invention.

We claim:

1. In a process of catalytic reforming in the presence of hydrogen and in the presence of a catalyst comprising aluminum oxide and a compound of a metal of the VI group of the periodic system, the method of maintaining a substantially constant net production of free hydrogen during a reaction portion of the cycle which comprises progressively increasing the proportion of saturated hydrocarbons in the feed stock as the reaction portion of the cycle proceeds.

2. In a process of catalytic reforming in the presence of hydrogen and in the presence of a catalyst comprising aluminum oxide and an oxide of a metal of the VI group of the periodic system and in which a reaction portion of the cycle is continued until the net quantity of free hydrogen being produced is insufficient to maintain the required concentration of hydrogen in the recycle gases, the method of prolonging the reaction portion of the cycle which comprises increasing the proportion of saturated hydrocarbons in the feed stock when it is observed that the net quantity of free hydrogen produced falls below the level necessary to maintain the required concentration of hydrogen in the recycle gases.

3. In the catalytic reforming of a hydrocarbon oil containing both saturated and unsaturated hydrocarbons in the presence of hydrogen and in the presence of a catalyst comprising an oxide of a metal of the VI group of the periodic system, the improved method of operation which consists in separating the hydrocarbon oil into two fractions, one rich in the saturated constituents thereof and the other rich in the unsaturated constituents, subjecting the fraction rich in the unsaturated constituents to reforming in the early stages of the reaction portion of the cycle and subjecting the fraction rich in the saturated constituents to reforming in the later stages of the same reaction portion of the same cycle.

ALBERT B. WELTY, Jr.
STEPHEN F. PERRY.